(12) United States Patent
Nguyen

(10) Patent No.: US 8,306,737 B2
(45) Date of Patent: Nov. 6, 2012

(54) NAVIGATION SYSTEM WITH ROUTE PLANNING AND METHOD OF OPERATION THEREOF

(75) Inventor: MinhHung Canh Nguyen, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 490 days.

(21) Appl. No.: 12/730,918

(22) Filed: Mar. 24, 2010

(65) Prior Publication Data

US 2011/0238299 A1 Sep. 29, 2011

(51) Int. Cl.
*G01C 21/30* (2006.01)
(52) U.S. Cl. .......... 701/410; 701/422; 701/428
(58) Field of Classification Search .......... 701/408–414, 701/422, 428
See application file for complete search history.

(56) References Cited

U.S. PATENT DOCUMENTS

| | | | |
|---|---|---|---|
| 7,133,768 B2 * | 11/2006 | Mukaiyama | 701/400 |
| 2002/0198653 A1 | 12/2002 | Lutter | |
| 2006/0278449 A1 | 12/2006 | Torre-Bueno | |
| 2007/0198140 A1 | 8/2007 | Mudalige | |
| 2007/0247291 A1 | 10/2007 | Masuda et al. | |
| 2007/0271034 A1 | 11/2007 | Perry | |
| 2008/0086240 A1 | 4/2008 | Breed | |
| 2008/0133131 A1 | 6/2008 | Poreda et al. | |

OTHER PUBLICATIONS

International Search Report for Application No. PCT/US2011/027329 dated Apr. 28, 2011.

* cited by examiner

*Primary Examiner* — Richard M. Camby
(74) *Attorney, Agent, or Firm* — Ishimaru & Associates; Mikio Ishimaru; Stanley M. Chang

(57) ABSTRACT

A method of operation of a navigation system includes: providing travel modes of a current travel community; checking current power levels of the travel modes; and generating a navigation instruction based on the current power levels for displaying on a device.

20 Claims, 7 Drawing Sheets

NAVIGATION SYSTEM WITH ROUTE PLANNING AND METHOD OF OPERATION THEREOF

TECHNICAL FIELD

The present invention relates generally to a navigation system, and more particularly to a system for route planning.

BACKGROUND ART

As users adopt mobile location-based service devices, new and old usage begin to take advantage of this new device space. There are many solutions to take advantage of this new device opportunity. One existing approach is to use location information to provide navigation services, such as a global positioning service (GPS) navigation system for a mobile device.

Modern portable consumer and industrial electronics provide increasing levels of functionality to support modern life including location-based information services. This is especially true for client devices such as navigation systems, cellular phones, portable digital assistants, and multifunction devices.

Navigation system and service providers are continually making improvement in the user's experience in order to be competitive. In navigation services, demand for better route planning is increasingly important. The navigation system with an efficient route planning can help drivers minimize fuel or energy consumption.

Thus, a need still remains for a navigation system with a route planning mechanism for providing a user-friendly experience and efficiency. In view of ease of use, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: providing travel modes of a current travel community; checking current power levels of the travel modes; and generating a navigation instruction based on the current power levels for displaying on a device.

The present invention provides a navigation system, including: travel modes of a current travel community; a control unit for checking current power levels of the travel modes; and a location unit, coupled to the control unit, for generating a navigation instruction based on the current power levels for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
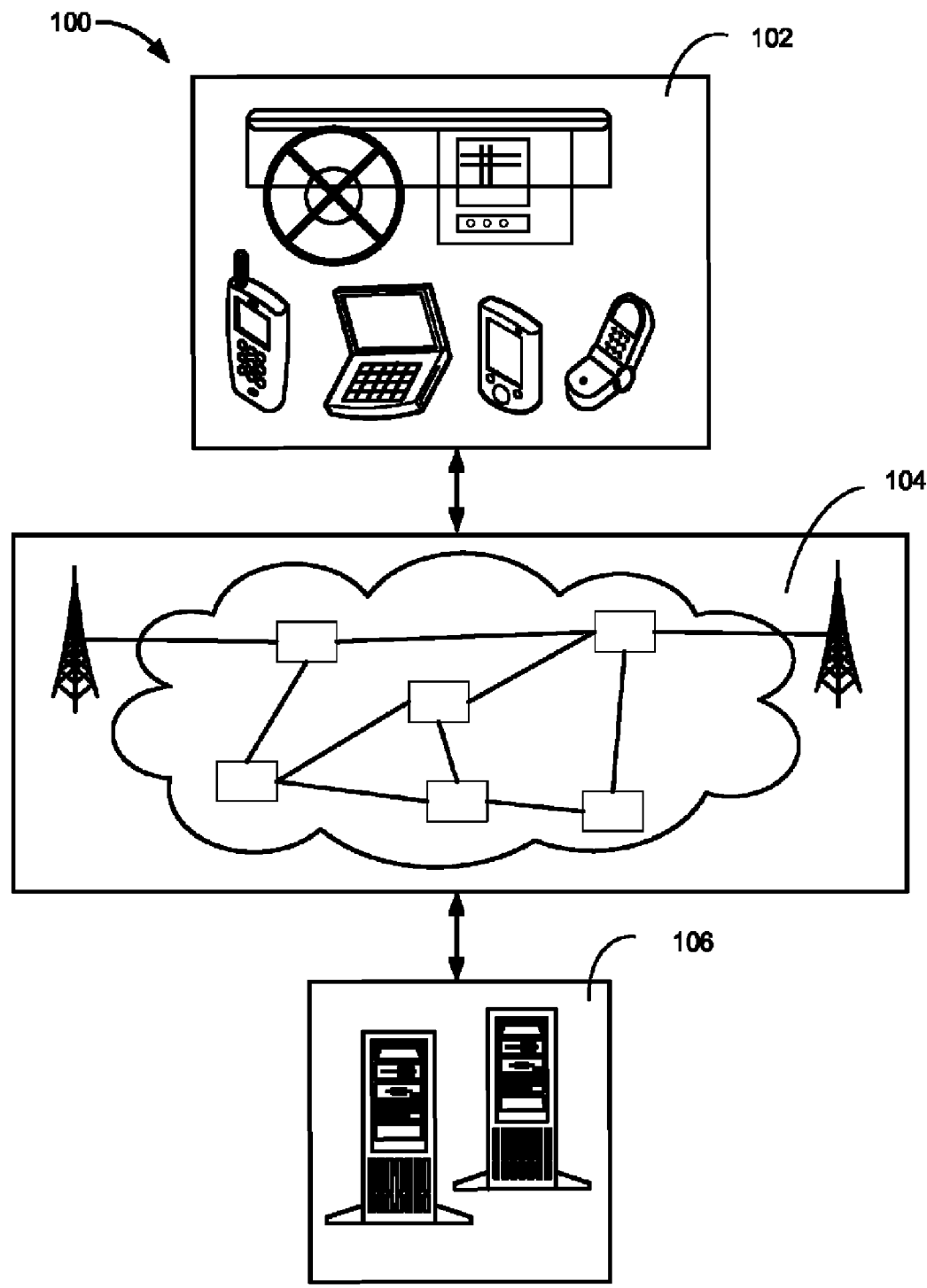
FIG. 1 is a navigation system with detection mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with detection mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
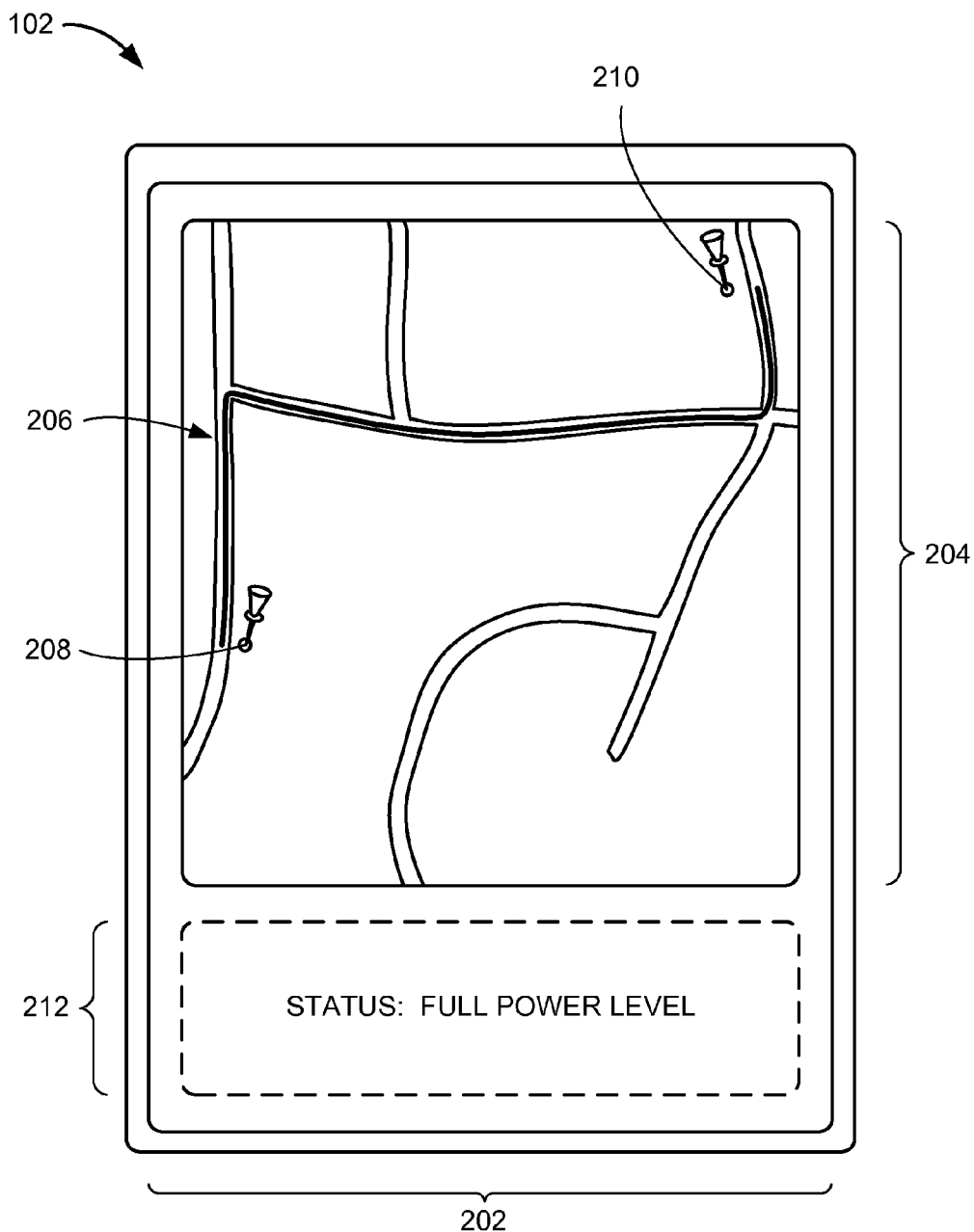
FIG. 2 is a display interface of the first device.

Referring now to FIG. 2, therein is shown a display interface 202 of the first device 102. The display interface 202 can include a display, a projector, a video screen, a speaker, or any combination thereof.

The display interface 202 can include a navigation map 204, which can include a visual presentation of an area. The navigation map 204 can also include a route 206, which can include a path for travel from an origin 208 or a starting point to a destination 210 or an ending point.

The display interface 202 can include a notification 212. The notification 212 can include information that is reported or presented by the navigation system 100 of FIG. 1 along the route 206.

For example, the notification 212 is shown as "STATUS: FULL POWER LEVEL" to indicate that a current power level is full. The notification 212 is shown in a textual representation, although it is understood that the notification 212 can be presented with audio, video, vibration, as examples.

Figure 3:
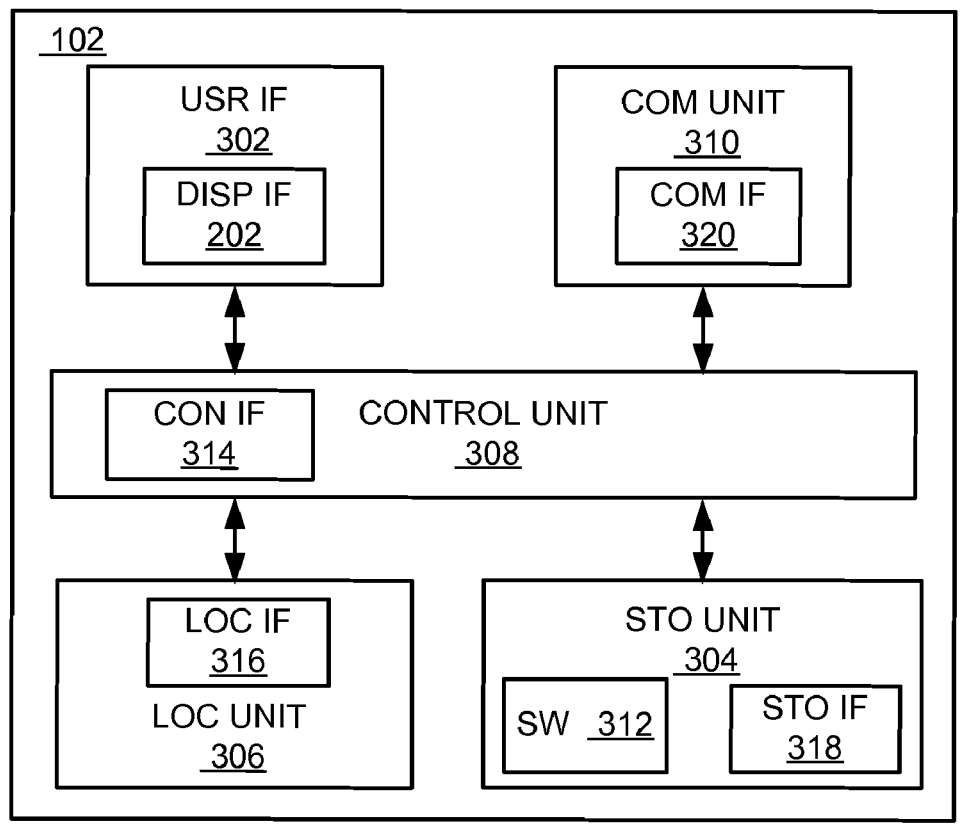
FIG. 3 is an exemplary block diagram of the first device.

Referring now to FIG. 3, therein is shown an exemplary block diagram of the first device 102. The first device 102 can include a user interface 302, a storage unit 304, a location unit 306, a control unit 308, and a communication unit 310.

The user interface 302 allows a user (not shown) to interface and interact with the first device 102. The user interface 302 can include an input device and an output device. Examples of the input device of the user interface 302 can include a keypad, a touchpad, soft-keys, a keyboard, a microphone, or any combination thereof to provide data and communication inputs. Examples of the output device of the user interface 302 can include the display interface 202. The display interface 202 can include a display, a projector, a video screen, a speaker, or any combination thereof.

The control unit 308 can execute a software 312 to provide the intelligence of the navigation system 100. The control unit 308 can operate the user interface 302 to display information generated by the navigation system 100. The control unit 308 can also execute the software 312 for the other functions of the navigation system 100, including receiving location information from the location unit 306. The control unit 308 can further execute the software 312 for interaction with the communication path 104 of FIG. 1 via the communication unit 310.

The control unit 308 can be implemented in a number of different manners. For example, the control unit 308 can be a processor, an embedded processor, a microprocessor, a hardware control logic, a hardware finite state machine (FSM), a digital signal processor (DSP), or a combination thereof.

The control unit 308 can include a controller interface 314. The controller interface 314 can be used for communication between the control unit 308 and other functional units in the first device 102. The controller interface 314 can also be used for communication that is external to the first device 102.

The controller interface 314 can receive information from the other functional units or from external sources, or can transmit information to the other functional units or to external destinations. The external sources and the external destinations refer to sources and destinations external to the first device 102.

The controller interface 314 can be implemented in different ways and can include different implementations depending on which functional units or external units are being interfaced with the controller interface 314. For example, the controller interface 314 can be implemented with a pressure sensor, an inertial sensor, a microelectromechanical system (MEMS), optical circuitry, waveguides, wireless circuitry, wireline circuitry, or a combination thereof.

The location unit 306 can generate location information, current heading, and current speed of the first device 102, as examples. The location unit 306 can be implemented in many ways. For example, the location unit 306 can function as at least a part of a global positioning system (GPS), an inertial navigation system, a cellular-tower location system, a pressure location system, or any combination thereof.

The location unit 306 can include a location interface 316. The location interface 316 can be used for communication between the location unit 306 and other functional units in the first device 102. The location interface 316 can also be used for communication that is external to the first device 102.

The location interface 316 can receive information from the other functional units or from external sources, or can transmit information to the other functional units or to external destinations. The external sources and the external destinations refer to sources and destinations external to the first device 102.

The location interface 316 can include different implementations depending on which functional units or external units are being interfaced with the location unit 306. The location interface 316 can be implemented with technologies and techniques similar to the implementation of the controller interface 314.

The storage unit 304 can store the software 312. The storage unit 304 can also store the relevant information, such as advertisements, points of interest (POI), navigation routing entries, or any combination thereof.

The storage unit 304 can be a volatile memory, a nonvolatile memory, an internal memory, an external memory, or a combination thereof. For example, the storage unit 304 can be a nonvolatile storage such as non-volatile random access memory (NVRAM), Flash memory, disk storage, or a volatile storage such as static random access memory (SRAM).

The storage unit 304 can include a storage interface 318. The storage interface 318 can be used for communication between the location unit 306 and other functional units in the first device 102. The storage interface 318 can also be used for communication that is external to the first device 102.

The storage interface 318 can receive information from the other functional units or from external sources, or can transmit information to the other functional units or to external destinations. The external sources and the external destinations refer to sources and destinations external to the first device 102.

The storage interface 318 can include different implementations depending on which functional units or external units are being interfaced with the storage unit 304. The storage interface 318 can be implemented with technologies and techniques similar to the implementation of the controller interface 314.

The communication unit 310 can enable external communication to and from the first device 102. For example, the communication unit 310 can permit the first device 102 to communicate with the second device 106 of FIG. 1, an attachment, such as a peripheral device or a computer desktop, and the communication path 104.

The communication unit 310 can also function as a communication hub allowing the first device 102 to function as part of the communication path 104 and not limited to be an end point or terminal unit to the communication path 104. The communication unit 310 can include active and passive components, such as microelectronics or an antenna, for interaction with the communication path 104.

The communication unit 310 can include a communication interface 320. The communication interface 320 can be used for communication between the communication unit 310 and other functional units in the first device 102. The communication interface 320 can receive information from the other functional units or can transmit information to the other functional units.

The communication interface 320 can include different implementations depending on which functional units are being interfaced with the communication unit 310. The communication interface 320 can be implemented with technologies and techniques similar to the implementation of the controller interface 314.

For illustrative purposes, the navigation system 100 is shown with the partition having the user interface 302, the storage unit 304, the location unit 306, the control unit 308, and the communication unit 310 although it is understood that the navigation system 100 can have a different partition. For example, the software 312 can be partitioned differently such that some or all of its function can be in the control unit 308, the location unit 306, and the communication unit 310. Also, the first device 102 can include other functional units not shown in FIG. 3 for clarity.

The functional units in the first device 102 can work individually and independently of the other functional units. The first device 102 can work individually and independently from the second device 106 and the communication path 104.

Figure 4:
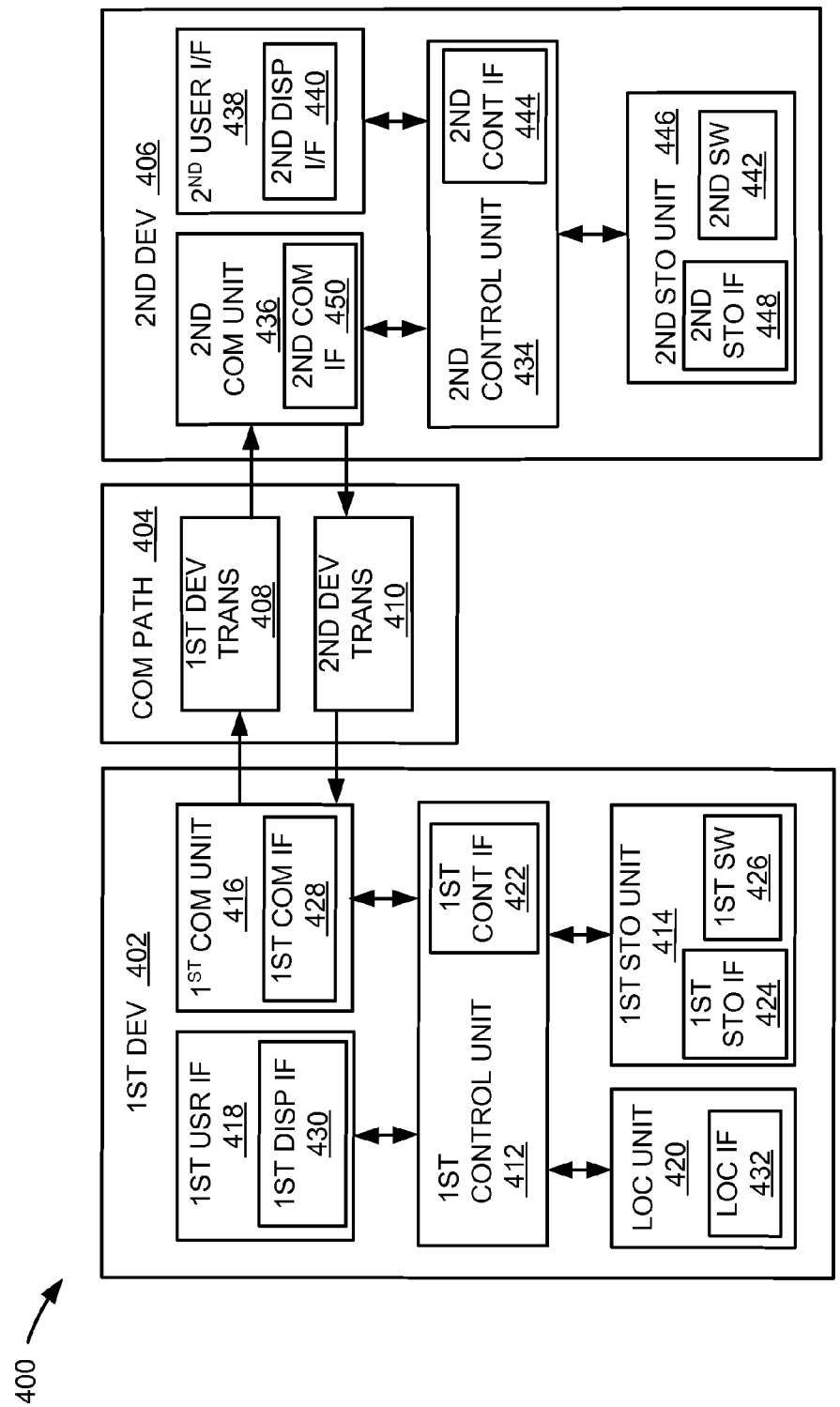
FIG. 4 is an exemplary block diagram of a navigation system with detection mechanism in a second embodiment of the present invention.

Referring now to FIG. 4, therein is shown an exemplary block diagram of a navigation system 400 with detection mechanism in a second embodiment of the present invention. The navigation system 400 can include a first device 402, a communication path 404, and a second device 406.

The first device 402 can communicate with the second device 406 over the communication path 404. For example, the first device 402, the communication path 404, and the second device 406 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 400.

The first device 402 can send information in a first device transmission 408 over the communication path 404 to the second device 406. The second device 406 can send information in a second device transmission 410 over the communication path 404 to the first device 402.

For illustrative purposes, the navigation system 400 is shown with the first device 402 as a client device, although it is understood that the navigation system 400 can have the first device 402 as a different type of device. For example, the first device 402 can be a server.

Also for illustrative purposes, the navigation system 400 is shown with the second device 406 as a server, although it is understood that the navigation system 400 can have the second device 406 as a different type of device. For example, the second device 406 can be a client device.

For brevity of description in this embodiment of the present invention, the first device 402 will be described as a client device and the second device 406 will be described as a server device. The present invention is not limited to this selection for the type of devices. The selection is an example of the present invention.

The first device 402 can include a first control unit 412, a first storage unit 414, a first communication unit 416, a first user interface 418, and a location unit 420. The first device 402 can be similarly described by the first device 102.

The first control unit 412 can include a first controller interface 422. The first control unit 412 and the first controller interface 422 can be similarly described as the control unit 308 of FIG. 3 and the controller interface 314 of FIG. 3, respectively.

The first storage unit 414 can include a first storage interface 424. The first storage unit 414 and the first storage interface 424 can be similarly described as the storage unit 304 of FIG. 3 and the storage interface 318 of FIG. 3, respectively. A first software 426 can be stored in the first storage unit 414.

The first communication unit 416 can include a first communication interface 428. The first communication unit 416 and the first communication interface 428 can be similarly described as the communication unit 310 of FIG. 3 and the communication interface 320 of FIG. 3, respectively.

The first user interface 418 can include a first display interface 430. The first user interface 418 and the first display interface 430 can be similarly described as the user interface 302 of FIG. 3 and the display interface 202 of FIG. 3, respectively.

The location unit 420 can include a location interface 432. The location unit 420 and the location interface 432 can be similarly described as the location unit 306 of FIG. 3 and the location interface 316 of FIG. 3, respectively.

The performance, architectures, and type of technologies can also differ between the first device 102 and the first device 402. For example, the first device 102 can function as a single device embodiment of the present invention and can have a higher performance than the first device 402. The first device 402 can be similarly optimized for a multiple device embodiment of the present invention.

For example, the first device 102 can have a higher performance with increased processing power in the control unit 308 compared to the first control unit 412. The storage unit 304 can provide higher storage capacity and access time compared to the first storage unit 414.

Also for example, the first device 402 can be optimized to provide increased communication performance in the first communication unit 416 compared to the communication unit 310. The first storage unit 414 can be sized smaller compared to the storage unit 304. The first software 426 can be smaller than the software 312 of FIG. 3.

The second device 406 can be optimized for implementing the present invention in a multiple device embodiment with the first device 402. The second device 406 can provide the additional or higher performance processing power compared to the first device 402. The second device 406 can include a second control unit 434, a second communication unit 436, and a second user interface 438.

The second user interface 438 allows a user (not shown) to interface and interact with the second device 406. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 400. The second software 442 can operate in conjunction with the first software 426. The second control unit 434 can provide additional performance compared to the first control unit 412 or the control unit 308.

The second control unit 434 can operate the second user interface 438 to display information. The second control unit 434 can also execute the second software 442 for the other functions of the navigation system 400, including operating the second communication unit 436 to communicate with the first device 402 over the communication path 404.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 406. The second controller interface 444 can also be used for communication that is external to the second device 406.

The second controller interface 444 can receive information from the other functional units or from external sources, or can transmit information to the other functional units or to external destinations. The external sources and the external destinations refer to sources and destinations external to the second device 406.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 400 is shown with the second storage unit 446 as a single hierarchy storage system, although it is understood that the navigation system 400 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 306 and other functional units in the second device 406. The second storage interface 448 can also be used for communication that is external to the second device 406.

The second storage interface 448 can receive information from the other functional units or from external sources, or can transmit information to the other functional units or to external destinations. The external sources and the external destinations refer to sources and destinations external to the second device 406.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 406. For example, the second communication unit 436 can permit the second device 406 to communicate with the first device 402 over the communication path 404.

The second communication unit 436 can also function as a communication hub allowing the second device 406 to function as part of the communication path 404 and not limited to be an end point or terminal unit to the communication path 404. The second communication unit 436 can include active and passive components, such as microelectronics or an antenna, for interaction with the communication path 404.

The second communication unit 436 can include a second communication interface 450. The second communication interface 450 can be used for communication between the second communication unit 436 and other functional units in the second device 406. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 404 to send information to the second device 406 in the first device transmission 408. The second device 406 can receive information in the second communication unit 436 from the first device transmission 408 of the communication path 404.

The second communication unit 436 can couple with the communication path 404 to send information to the first device 402 in the second device transmission 410. The first device 402 can receive information in the first communication unit 416 from the second device transmission 410 of the communication path 404. The navigation system 400 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 406 can include other functional units not shown in FIG. 4 for clarity.

The functional units in the first device 402 can work individually and independently of the other functional units. The first device 402 can work individually and independently from the second device 406 and the communication path 404.

The functional units in the second device 406 can work individually and independently of the other functional units. The second device 406 can work individually and independently from the first device 402 and the communication path 404.

For illustrative purposes, the navigation system 400 is described by operation of the first device 402 and the second device 406. It is understood that the first device 402 and the second device 406 can operate any of the modules and functions of the navigation system 400. For example, the first device 402 is described to operate the location unit 420, although it is understood that the second device 406 can also operate the location unit 420.

Figure 5:
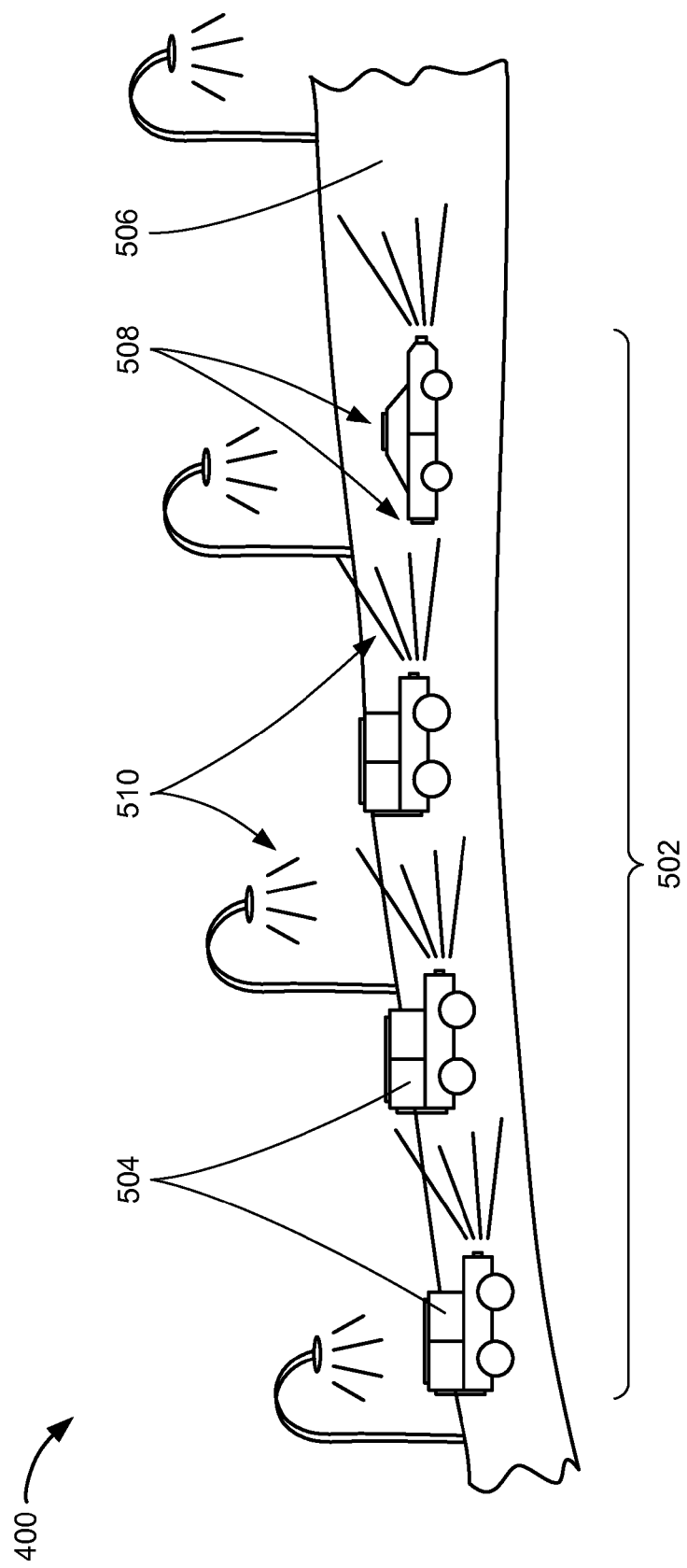
FIG. 5 is a view of the navigation system in an exemplary application.

Referring now to FIG. 5, therein is shown a view of the navigation system 400 in an exemplary application. The view depicts a current travel community 502 including a group of travel modes 504. The current travel community 502 can preferably include the travel modes 504 moving together or in the same direction.

The travel modes 504 can include vehicles or any mechanical means of carriage. The travel modes 504 can provide transport for travelers. For example, the travel modes 504 can include a car, a bicycle, a motorcycle, a bus, a train, or any other transport method.

One of the travel modes 504 can travel along a route 506. The route 506 can be represented by the route 206 of FIG. 2. The route 506 or a portion of the route 506 can be shared with or travelled by another of the travel modes 504.

The route 506 can be a regular route travelled or taken by the travel modes 504. The present invention can also provide future plans that can include forming the route 506 or the travel modes 504 forming the current travel community 502.

The current travel community 502 can be isolated from another of the current travel community 502. For example, the current travel community 502 can be displayed as a dot or a graphic symbol along the route 206 of FIG. 2 in the navigation map 204 of FIG. 2. The travel modes 504 of the current travel community 502 can be processed or guided as a whole rather than individually to reduce computation complexity of a tracking or routing system.

Each of the travel modes 504 can have community benefits by being part of the current travel community 502. The community benefits can include receive energy from each other's light sources, share fun or common interests, provide attention mutually among the travel modes 504, or provide assistance to help one another in case of an emergency.

The travel modes 504 can include an electrical panel 508, such as a device that collects energy from lights and produces electric current. For example, the electrical panel 508 can include a solar panel that converts sunlight into electricity. The electrical panel 508 can be attached to or included in front, rear, left, right, any surface of the travel modes 504, or any combination thereof.

The energy from the lights can be based on a light intensity 510, which can include a measurement of an electromagnetic radiation. For example, the lights can include sunlight or lights from a street light, a lamppost, or a light pole, which can optionally include motion sensors that can detect movement of the travel modes 504 or any moving objects.

The travel modes 504 can be instructed to form or move in a row or a geometrical line along the route 506. As such, the lights can be passed on or emitted from one of the travel modes 504 to another of the travel modes 504 in the current travel community 502.

For example, one of the travel modes 504 can shine or emit the lights to the electrical panel 508 mounted on the rear of another of the travel modes 504, which can be in the front of the one of the travel modes 504. Also for example, the lights can be collected with the electrical panel 508 attached on the rear, front, sides, or top of the travel modes 504.

Figure 6:
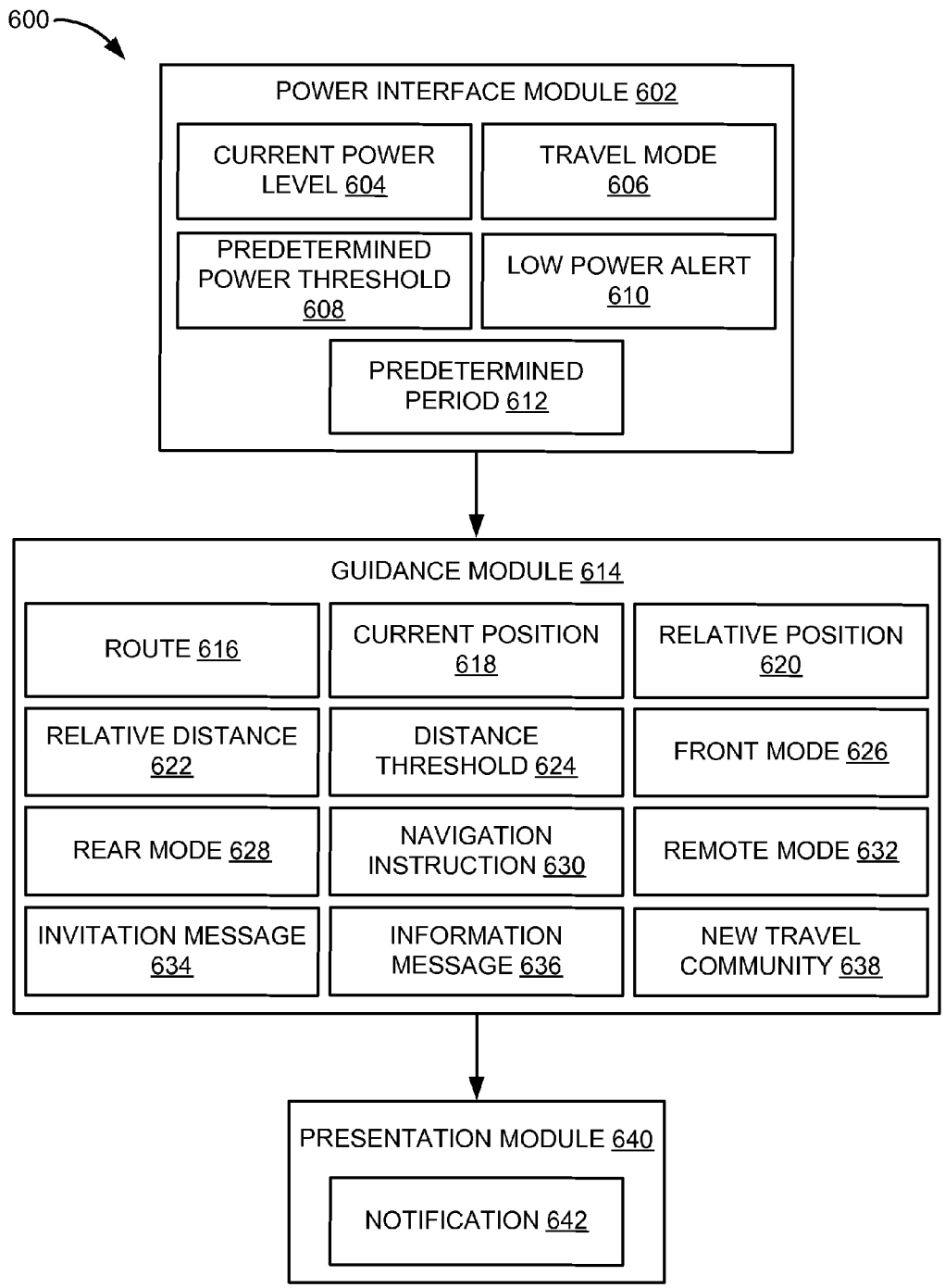
FIG. 6 is a navigation system with detection mechanism in a third embodiment of the present invention.

Referring now to FIG. 6, therein is shown a navigation system 600 with detection mechanism in a third embodiment of the present invention. The navigation system 600 can include a power interface module 602 to communicate with a supply unit that provides power or energy.

The power interface module 602 can obtain a current power level 604 indicating a presently measured level of a supply unit of a travel mode 606 substantially the same as one of the travel modes 504 of FIG. 5. The current power level 604 can be manually input. The current power level 604 can be provided via a direct link or a communication path between the power interface module 602 and the supply unit.

The current power level 604 can include a voltage measurement of a battery, which can be charged by a system including the electrical panel 508 of FIG. 5 and a charging circuit to collect lights and convert the lights to electricity. For example, the lights can come from the sun. Also for example, the lights can include street lights or lights of adjacent vehicles.

The power interface module 602 can check the current power level 604 of one or more of the travel modes 504. For example, the current power level 604 can be checked by being compared to a predetermined power threshold 608, below which a low power alert 610 can be generated by the power interface module 602.

The power interface module 602 can monitor the current power level 604 during a predetermined period 612 including an amount of time that is preset or manually configured. For example, the predetermined period 612 can be preset to start at sunset. Also for example, the predetermined period 612 can include a duration when the travel mode 606 travels at night.

The power interface module 602 can be implemented with the navigation system 400 of FIG. 4. For example, the power interface module 602 can be implemented with the first control unit 412 of FIG. 4, the first storage unit 414 of FIG. 4, the first communication unit 416 of FIG. 4, the first user interface 418 of FIG. 4, the communication path 404 of FIG. 4, the second control unit 434 of FIG. 4, the second communication unit 436 of FIG. 4, the second user interface 438 of FIG. 4, the second storage unit 446 of FIG. 4, or a combination thereof.

The navigation system 600 can include a guidance module 614, which can include a routing system or functions for predicting, calculating, or estimating a route 616. The route 616 can be represented by the route 506 of FIG. 5. The guidance module 614 can be coupled or connected to the power interface module 602.

The guidance module 614 can calculate a current position 618 of the travel mode 606. The current position 618 can be calculated based on latitude, longitude, altitude, or a combination thereof.

The current position 618 can be used to determine a relative position 620 of the travel mode 606 in the current travel community 502 of FIG. 5. The relative position 620 can indicate where the travel mode 606 is with respect to the rest or another of the travel modes 504 in the current travel community 502. For example, the relative position 620 can indicate whether the travel mode 606 is in the front, middle, or end of the current travel community 502.

The guidance module 614 can calculate a relative distance 622 between the travel modes 504 that are adjacent or next to each other. The travel modes 504 are determined to be in or part of the current travel community 502 if the relative distance 622 is less than a distance threshold 624.

The distance threshold 624 can be preset. The distance threshold 624 can be predetermined or configured to a distance value below which the light intensity 510 of FIG. 5 of one of the travel modes 504 is sufficient for the electrical panel 508 of another of the travel modes 504 to collect to generate electricity.

With the relative position 620, the relative distance 622 or a combination thereof, the guidance module 614 can determine a front travel mode 626 of the current travel community 502. The front travel mode 626 can be determined by identifying the travel mode 606 with the relative distance 622 less than the distance threshold 624, the relative distance 622 between the travel mode 606 and another of the travel mode 606 behind thereof.

The front travel mode 626 is defined as the travel mode 606 that is at or in the front or beginning of the current travel community 502. In other words, there is none of the travel modes 504 in the current travel community 502 that is ahead of the front travel mode 626.

With the relative position 620, the relative distance 622 or a combination thereof, the guidance module 614 can determine a rear travel mode 628 of the current travel community 502. The rear travel mode 628 can be determined by identifying the travel mode 606 with the relative distance 622 less than the distance threshold 624, the relative distance 622 between the travel mode 606 and another of the travel mode 606 ahead thereof.

The rear travel mode 628 is defined as the travel mode 606 that is at or in the rear or end of the current travel community 502. In other words, there is none of the travel modes 504 in the current travel community 502 that is behind the rear travel mode 628. The rear travel mode 628 has the most disadvantages since there is none of the travel modes 504 behind the rear travel mode 628 to shine the lights to the electrical panel 508 of the rear travel mode 628.

The guidance module 614 can generate a navigation instruction 630 to direct or guide the travel mode 606 along the route 616. The navigation instruction 630 can be generated based on the current power level 604, the relative position 620, or a combination thereof. For example, when the current power level 604 of the rear travel mode 628 is below the predetermined power threshold 608, the guidance module 614 can generate the navigation instruction 630 to direct the rear travel mode 628 to move to the front of the current travel community 502.

The rear travel mode 628 having the relative position 620 of being at the end of the current travel community 502 can be instructed to take turn to move ahead to be in the front of the current travel community 502. As such, the electrical panel 508 attached to the rear of the rear travel mode 628 can collect the lights so that the battery of the rear travel mode 628 can get charged.

The power interface module 602 can check the current power level 604 of the travel modes 504. The current power level 604 of one of the travel modes 504 can be compared to that of another of the travel modes 504. For example, the power interface module 602 can identify the travel mode 606 having the current power level 604 lower than the rest of the travel modes 504 in the current travel community 502. Further to the example, the guidance module 614 can instruct the travel mode 606 to move ahead to be in the front of the current travel community 502.

The guidance module 614 can detect or identify a remote travel mode 632 that travels in the same direction as the travel mode 606 in the current travel community 502. The remote travel mode 632 is not one of the travel modes 504 in the current travel community 502.

The remote travel mode 632 can be identified based on the current position 618 of the remote travel mode 632 in relation to the current position 618 of the travel modes 504 in the current travel community 502. The relative distance 622 between the remote travel mode 632 and the travel modes 504 can be greater than the distance threshold 624.

The guidance module 614 can generate an invitation message 634 that can be sent to the remote travel mode 632. The invitation message 634 can be sent in case the remote travel mode 632 is interested to join the current travel community 502.

The invitation message 634 can be generated based on the current position 618 of the remote travel mode 632 and a geographical area or a geofence of the current travel community 502. For example, the guidance module 614 can generate the invitation message 634 if the current position 618 of the remote travel mode 632 is within the geofence or a boundary of the current travel community 502.

The invitation message 634 can include an information message 636 based on the current travel community 502. The information message 636 can include navigation information related to the current travel community 502.

The navigation information can include the current position 618 of the current travel community 502. The navigation information can include a waypoint or a location that the current travel community 502 is travelling to or passes by along the route 616. The navigation information can include a size (e.g. a count of the travel modes 504) of the current travel community 502, a direction in which the current travel community 502 is heading or traveling to, or the route 616 of the current travel community 502.

The remote travel mode 632 can acknowledge receipt of the invitation message 634 and can optionally select whether the remote travel mode 632 would like to join the current travel community 502. If the remote travel mode 632 sends a response to express an interest to join the current travel community 502, the guidance module 614 can generate guidance instructions to direct the remote travel mode 632 to the current position 618 of the current travel community 502.

The guidance module 614 can direct the remote travel mode 632 to the front, middle, or end of the current travel community 502 based on the current power level 604 of the remote travel mode 632. For example, if the current power level 604 of the remote travel mode 632 is below the predetermined power threshold 608, the guidance module 614 can direct the remote travel mode 632 to the front of the current travel community 502.

The guidance module 614 can identify a new travel community 638 that can be joined by the travel mode 606. The new travel community 638 can include a group of other travel modes that are different from the travel modes 504 of the current travel community 502.

The guidance module 614 can direct the travel mode 606 to the new travel community 638 when the travel mode 606 changes directions or is instructed to turn along the route 616. The guidance module 614 can re-calculate the route 616 based on the detection of the new travel community 638.

The guidance module 614 can instruct the travel mode 606 to join the new travel community 638 to refill the energy supply in order for the travel mode 606 to reach the destination 210 of FIG. 2. The guidance module 614 can calculate or determine the route 616 based on the availability or detection of the current travel community 502 and a number of the new travel community 638.

The guidance module 614 can generate navigation information for the current travel community 502 as a whole instead of individual navigation instructions for each of the travel modes 504. For example, the guidance module 614 can generate the navigation instruction 630 to direct an entirety of the current travel community 502 so that the travel modes 504 of the current travel community 502 can altogether travel along the route 616.

The guidance module 614 can receive live data related to the current travel community 502, the travel modes 504, or the new travel community 638. The live data can be fed back to the guidance module 614 with real-time data feed or any mechanism that provides updated data.

The guidance module 614 can be a best-to-know or intelligent system such that it can calculate the route 616 for the travel modes 504. Prior to joining the current travel community 502, the travel modes 504 can be isolated from the current travel community 502. Subsequently, the guidance module 614 can send the navigation instruction 630 to guide the travel modes 504 to join the current travel community 502.

The guidance module 614 can generate and send the invitation message 634 to the current travel community 502 and the new travel community 638, providing information to both communities so that they can join each other. As such, the current travel community 502 and the new travel community 638 are no longer isolated, closing gaps between isolated travel communities. The current travel community 502 and the new travel community 638 can join each other to form a larger travel community.

The guidance module 614 can be implemented with the navigation system 400 of FIG. 4. For example, the guidance module 614 can be implemented with the first control unit 412 of FIG. 4, the first storage unit 414 of FIG. 4, the first communication unit 416 of FIG. 4, the first user interface 418 of FIG. 4, the location unit 420 of FIG. 4, the communication path 404 of FIG. 4, the second control unit 434 of FIG. 4, the second communication unit 436 of FIG. 4, the second user interface 438 of FIG. 4, the second storage unit 446 of FIG. 4, or a combination thereof.

The navigation system 600 can include a presentation module 640 to send, present, or display a notification 642, which can include information or messages for travel, on the first device 402 of FIG. 4 or the second device 406 of FIG. 4. The notification 642 can be represented by the notification 212 of FIG. 2. The presentation module 640 can be coupled or connected to the guidance module 614.

The power interface module 602 can enable the presentation module 640 to present the notification 642. The notification 642 can include the low power alert 610 to inform the travel mode 606 that the current power level 604 of the travel mode 606 is below the predetermined power threshold 608.

The guidance module 614 can enable the presentation module 640 to display the notification 642. The notification 642 can include information about the route 616 or the navigation instruction 630 to direct the travel mode 606.

For example, the presentation module 640 can be instructed by the guidance module 614 to send the invitation message 634 to request the remote travel mode 632 to join the current travel community 502. Also for example, the presentation module 640 can also be instructed by the guidance module 614 to send the information message 636 about the current travel community 502 to the remote travel mode 632.

The presentation module 640 can be implemented with the navigation system 400 of FIG. 4. For example, the presentation module 640 can be implemented with the first control unit 412 of FIG. 4, the first storage unit 414 of FIG. 4, the first communication unit 416 of FIG. 4, the first user interface 418 of FIG. 4, the communication path 404 of FIG. 4, the second control unit 434 of FIG. 4, the second communication unit 436 of FIG. 4, the second user interface 438 of FIG. 4, the second storage unit 446 of FIG. 4, or a combination thereof.

It has been discovered that the navigation instruction 630 generated for the travel mode 606 in the current travel community 502 significantly conserves fuel or effectively replenishes energy during travel. The current power level 604 is efficiently monitored so that fuel consumption can be minimized.

It has also been discovered that the navigation instruction 630 is efficiently generated to greatly improve the environment by reducing consumption of fuel for travelers, thereby eliminating pollution.

The physical transformation of data of the current power level 604, the low power alert 610, the current position 618, the relative position 620, the relative distance 622, the navigation instruction 630, the invitation message 634, and the information message 636 to the route 616 and the identification of the front travel mode 626, the rear travel mode 628, the remote travel mode 632, and the new travel community 638 results in movement in the physical world, such as people using the first device 402, the second device 406, or vehicles, based on the operation of the navigation system 600. As the movement in the physical world occurs, the movement itself creates additional information that is converted back to the data for further processing with the current power level 604, the low power alert 610, the current position 618, the relative position 620, the relative distance 622, the navigation instruction 630, the invitation message 634, and the information message 636 for the continued operation of the navigation system 600 and to continue the movement in the physical world.

Thus, it has been discovered that the navigation system 600 of the present invention furnishes important and heretofore unknown and unavailable solutions, capabilities, and functional aspects for providing energy efficiency and eco-friendliness.

The navigation system 600 describes the module functions or order as an example. The modules can be partitioned differently. For example, the guidance module 614 is shown as a single module, although the guidance module 614 can be implemented in multiple modules. Each of the modules can operate individually and independently of the other modules.

Figure 7:
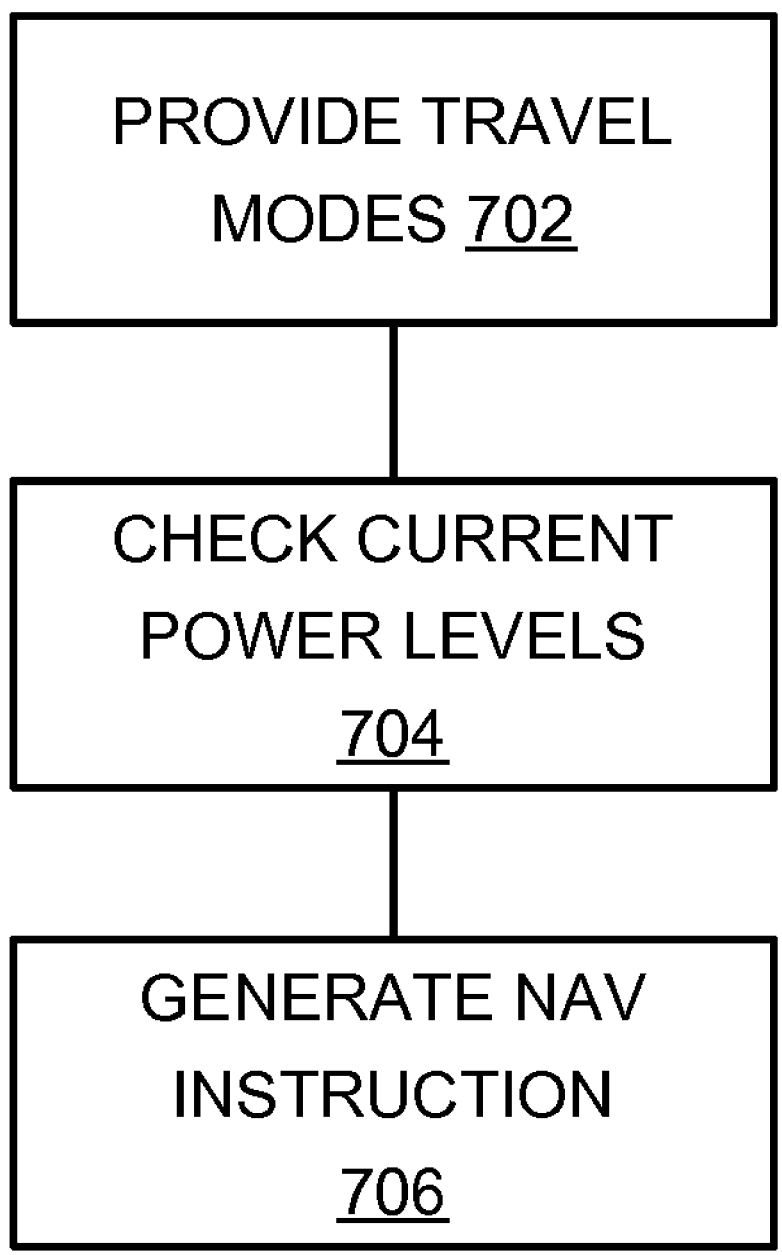
FIG. 7 is a flow chart of a method of operation of a navigation system in a further embodiment of the present invention.

Referring now to FIG. 7, therein is shown a flow chart of a method 700 of operation of a navigation system in a further embodiment of the present invention. The method 700 includes: providing travel modes of a current travel community in a block 702; checking current power levels of the travel modes in a block 704; and generating a navigation instruction based on the current power levels for displaying on a device in a block 706.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto set forth herein or shown in the accompanying drawings are to be interpreted in an illustrative and non-limiting sense.

What is claimed is:

1. A method of operation of a navigation system comprising:
providing travel modes of a current travel community;
checking current power levels of the travel modes; and
generating a navigation instruction based on the current power levels for displaying on a device.

2. The method as claimed in claim 1 further comprising monitoring the travel modes during a predetermined period.

3. The method as claimed in claim 1 further comprising determining a relative position of one of the travel modes to another of the travel modes in the current travel community.

4. The method as claimed in claim 1 further comprising sending an information message based on the current travel community.

5. The method as claimed in claim 1 further comprising identifying a remote travel mode traveling in the same direction as the travel modes.

6. A method of operation of a navigation system comprising:
providing travel modes of a current travel community;
checking current power levels of the travel modes;
calculating a relative position of one of the travel modes to another of the travel modes in the current travel community; and
generating a navigation instruction based on the current power levels, the relative position, or a combination thereof for displaying on a device.

7. The method as claimed in claim 6 further comprising determining a front travel mode of the current travel community or a rear travel mode of the current travel community.

8. The method as claimed in claim 6 further comprising identifying a new travel community to be joined with the current travel community.

9. The method as claimed in claim 6 further comprising identifying a new travel community to be joined by the one of the travel modes of the current travel community.

10. The method as claimed in claim 6 further comprising:
identifying a remote travel mode traveling in the same direction as the travel modes; and
sending an invitation message to the remote travel mode.

11. A navigation system comprising:
travel modes of a current travel community;
a control unit for checking current power levels of the travel modes; and
a location unit, coupled to the control unit, for generating a navigation instruction based on the current power levels for displaying on a device.

12. The system as claimed in claim 11 wherein the control unit is for monitoring the travel modes during a predetermined period.

13. The system as claimed in claim 11 wherein the location unit is for determining a relative position of one of the travel modes to another of the travel modes in the current travel community.

14. The system as claimed in claim 11 further comprising a user interface, coupled to the location unit, for sending an information message based on the current travel community.

15. The system as claimed in claim 11 wherein the control unit is for identifying a remote travel mode traveling in the same direction as the travel modes.

16. The system as claimed in claim 11 wherein:
the control unit is for calculating a relative position of one of the travel modes to another of the travel modes in the current travel community; and
the location unit is for generating a navigation instruction based on the current power levels, the relative position, or a combination thereof.

17. The system as claimed in claim 16 wherein the control unit is for determining a front travel mode of the current travel community or a rear travel mode of the current travel community.

18. The system as claimed in claim 16 wherein the control unit is for identifying a new travel community to be joined with the current travel community.

19. The system as claimed in claim 16 wherein the control unit is for identifying a new travel community to be joined by the one of the travel modes of the current travel community.

20. The system as claimed in claim 16 wherein:
the control unit is for identifying a remote travel mode traveling in the same direction as the travel modes; and
further comprising:
a user interface, coupled to the control unit, for sending an invitation message to the remote travel mode.

* * * * *